Patented June 29, 1937

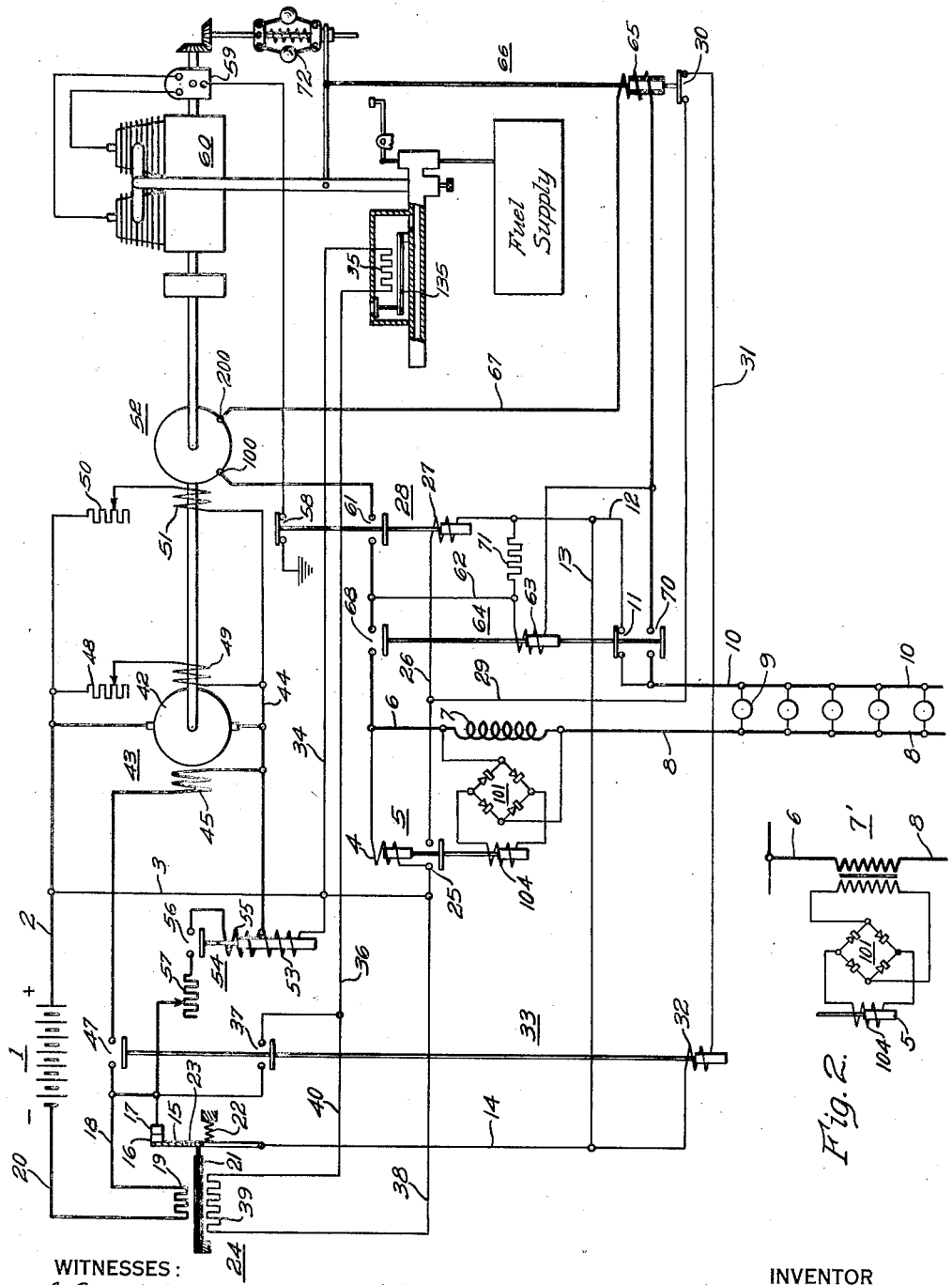

2,085,072

UNITED STATES PATENT OFFICE 2,085,072

SMALL ELECTRIC POWER PLANT

Stanley A. Bobe, McKeesport, Pa., assignor to Westinghouse Electric & Manufacturing Company, East Pittsburgh, Pa., a corporation of Pennsylvania Application June 14, 1934, Serial No. 730,562

20 Claims. (Cl. 290—30)

My invention relates generally to small electric power plants, and more particularly to control systems for electric power plants such as are used for farm lighting, the operation of beacons, or the operation of searchlights.

More particularly my invention relates to automatic electric generating systems wherein the load lines are supplied with standard voltage, single phase or polyphase alternating-current but wherein the starting is effected by a comparatively small direct-current motor operated by a battery.

One object of my invention is to provide for automatically starting the prime mover of my power plant from a source of direct current, whenever a load is connected to the alternating-current mains.

Another object of my invention is to start the power plant from a battery by means of a direct-current motor when a load is applied to the main load lines and to provide for making the normal operation of the starting means and the main portion of the power plant substantially independent.

A more specific object of my invention is to provide for starting a power plant supplying alternating-current to mains from a source of direct current when a load is applied to the mains, disconnecting the load from the source of direct current after the plant has started, and charging the battery, constituting the source of direct current during normal operation of the plant.

Other objects and advantages of my invention will become more apparent from a study of the following specification and the accompanying drawing, in which:

Figure 1 is a diagrammatic showing of a power plant and the system of control embodying my invention; and Fig. 2 is a diagrammatic showing of a modification of a detail of my invention.

Referring to the drawing, my system of control comprises in general an internal combustion engine or any other prime mover 60 provided with an ignition system 59, and a mechanical governor 72 for controlling the fuel supplied to the engine from the fuel tank, this mechanical governor coacting with an electromagnetic governor 66 operable in response to the load on an alternating-current generator 52 mechanically coupled to the prime mover.

The alternating-current generator 52 is of the type for supplying standard alternating-current voltages to a pair of power mains 8 and 10, which standard voltages may be 110, 220 or 550 volts, or any other voltage usually found desirable to be supplied to power or service mains.

To provide for the proper starting of the internal combustion engine, a direct current motor 43 is also coupled to the internal combustion engine, which motor is designed to operate as a generator when the engine is operating at normal speeds to charge a battery 1, which constitutes the source of direct current power for energizing the motor 43 during the starting cycle, and for exciting the field winding 51 of the alternator 52. To prevent depletion of the battery 1, should the system fail to start, a thermostatic time limit cranking control relay 24 is so interconnected with the control system that the motor 43 will be disconnected from the battery 1 should the engine fail to start.

The design of my control system is such that application of a load across the service mains 8 and 10 actuates a relay or contactor 5, which contactor is provided with a pair of coils 4 and 104 adapted to be connected to the source of direct-current power 1 and to the alternator 52, respectively. Application of the load, by reason of the energization of the contactor 5, establishes a starting circuit for the motor 43 from the battery 1 whereupon the engine is cranked. After the engine starts and has attained a predetermined speed, the voltage of the alternator 52 will, of course, rise, whereupon the effect of coil 4 is minimized or substantially eliminated whereas the effect of coil 104 is increased to nevertheless maintain a circuit between the alternator 52 and the service mains 8 and 10. During such operation, when the alternator 52 supplies the energy to the service mains 8 and 10, the motor 43 will be operating as a generator to charge the battery 1 and excite the generator. The charging rate may, of course, be adjusted by a suitable resistor 57 and either continued or discontinued by appropriate operation of the contactor 54.

During the starting cycle, it is, of course, important that the fuel supply to the engine be increased and to this end the thermostatic choke 135 is provided for the engine, which thermostatic choke is heated by an electric heater 35 to vary the fuel supply and gradually decrease it as the cranking operation continues. However, after the engine starts, the heater 35 is disconnected and the engine operates at a speed determined by the setting of the throttle as determined by the joint action of the governors 72 and 66 acting on the throttle.

A better understanding of the novel features of my invention may be had from a study of the sequence of a typical starting operation, and the normal operation that is intended to result when the plant has been started. As long as no load has been connected to the service mains 8 and 10, the battery 1 will be on open circuit and all of the elements shown in Fig. 1 will be in the position illustrated. However, when a current-consuming unit 9 is connected across the service mains 8 and 10, a circuit is established from the positive terminal of the battery 1 through conductors 2 and 3, actuating coil 4 of the contactor 5, conductor 6, reactor 7, conductor or service main 8, current-consuming device 9, conductor 10, back contact member 11 of the two pole contactor 64, conductors 12, 13 and 14, spring biased lever 15 of the thermostatic crank control relay 24, contact members 16 and 17, conductor 18, series heater 19 of the relay 24 and conductor 20 to the other or negative terminal of the battery 1.

The energization of the actuating coil 4 operates the contactor 5 to close the contact members 25, whereupon a circuit is established from the positively energized conductor 3 through contact members 25, conductor 26, and actuating coil 27 of line contactor 28 to the negatively energized conductor 13. A second circuit is established from the positively energized conductor 26 through conductor 29, back contact members 30 of the electromagnetic governor 66, conductor 31, and actuating coil 32 of the starting control contactor 33 to the negatively energized conductor 14. Operation of the line contactor 28 opens the short-circuit for the igniter or magneto 59 at the contact members 58, thereby providing for appropriate ignition of the internal combustion engine 60 and closes contact members 61. The closing of the contact members 61 at this operation of the line contactor 28 does not yet establish a closed circuit for the alternator 52, since the double-pole contactor 64 is at this stage of operation not yet energized. Thus the alternator circuit is maintained open at the contact members 68.

The energization of actuating coil 32 operates the starting control contactor 33 to close its contact members 37 and 47. Operation of the starting control contactor 33 establishes a circuit from the energized conductor 3 through conductor 34, heater 35 for the thermostatic choke 135, conductor 36, and contact members 37 to the negatively energized conductor 18. A second circuit is established from the positively energized conductor 3 through conductor 38, shunting heater 39 of the cranking control relay 24 and conductor 40 to the negatively energized conductor 36.

The cranking control relay 24 is provided with a series heater 19 and a shunt heater 39 and a thermostatic element 21. This thermostatic element 21 will thus be heated as a function of the voltage of the battery and also of the starting current consumed by the motor 43, whereby the time constant of the relay will be made to depend upon the state of the battery and be shorter when a heavy current is needed to start the engine than would be the case when a comparatively light current is needed to start the engine. If the engine fails to start within a reasonable time and there may be danger of depletion of the battery 1, the thermostatic element 21 will curve in a counter-clockwise direction and the end thereof will engage the aperture 23, whereupon the spring 22 will cause the opening of the circuits traced through the contact members 16 and 17. Any further cranking of the engine will thus be prevented and the relay would have to be manually reset to initiate a starting cycle and the attendant will thus be apprised of the fact that the battery voltage may be too low or that there is some trouble in the system. The appropriate correction or repair may thus be made before any permanent damage is done to the battery or any other parts of the circuits.

The starting circuit for the motor 43 may be traced from the positively energized conductor 2 through the armature 42, conductor 44, series field winding 45, and contact members 47 of the starting control contactor 33 to the negatively energized conductor 18. It will be noted that the shunt field winding 49 for the motor and the control rheostat 48 therefor are connected directly across conductors 2 and 44 for the motor 43 and that the field winding 51 and the field control rheostat 50 for the generator 52 are also connected directly across conductors 2 and 44, which conductors, after the closing of contact members 47, are positively and negatively energized, respectively. A still further circuit is established for the battery charging control contactor 54, which circuit may be traced from the conductor 3 through actuating coil 53 to the negatively energized conductor 44. Operation of the charging control contactor 54 closes the contact members 56, thereby connecting the actuating coils 53 and 55 in series across the conductors 3 and 18, respectively, this circuit being completed through the contact members 56 and the adjustable charging control resistor 57.

However, when the engine starts, the voltage of the alternator 52 will, of course, rise thereby establishing a circuit from the terminal 100 of the alternator 52 through the contact members 61, conductor 62, actuating coil 63 of the line contactor 64, actuating coil 65 of the electromagnetic governor 66 and conductor 67 to the alternator terminal 200. With the rise in voltage of the alternator, it is no longer desirable to have the battery nor the dynamo-electric machine 43 connected to the load lines and the disconnection of these units from the load lines is accomplished by the opening of the back contact members 11 of the two-pole contactor 64.

However, the closing of the contact members 68 by the operation of the contactor 64 establishes a circuit from the terminal 100 of the alternator through the contact members 61 and 68, respectively, conductor 6, the reactor 7, load lines 8 and 10 to the current-consuming device or devices 9, contact members 70 of contactor 64, actuating coil 65 of the governor 66 and conductor 67 to the alternator terminal 200. The operation of the contactor 64 also connects a resistor 71 of a high resistance value in the circuit of the actuating coil 4 of the contactor 5, the resistance value being of sufficient magnitude that the effect of coil 4 becomes negligible. However, by the provision of the double wave rectifier 101 connected across the terminals of the reactor 7, a direct current is supplied to the actuating coil 104 of relay 5, thus maintaining the contact members 25 closed even though the alternator 52 be now supplying energy to the current-consuming devices 9. The circuit for actuating coil 4 will now be from the energized conductor 3 through contact members 68, conductor 62 and resistor 71 to the negatively energized conductor 13.

With an appropriate rise in the voltage of the alternator, the contact members 30 of the electromagnetic governor 66 are, of course, opened whereupon the cranking control contactor 33 is deenergized thereby deenergizing the heaters 35 and 39 and also disconnecting the motor 43 from the battery by the opening of the contact members 47. However, since contact members 56 are still closed and remain closed, the charging circuit for the battery 1 is now established from the positive or upper terminal of the generator 43 through conductor 2, battery 1, conductor 20, heater 19, conductor 18, charging control rheostat 57, contact members 56 and coil 55 of the contactor 54 to the negative terminal of the generator 43.

It should be noted that the circuit from the alternator 52, heretofore traced, for the current-consuming devices 9, passes through the reactor 7. The reactance value of this reactor 7 is so chosen that the current variation in coil 104 will be relatively small compared to the current variations through the reactor 7. For one installation it has been found that a variation in load over a range of 1 to 100 caused a variation over a range of only 1 to 3 in the current in coil 104. This materially improves the efficiency of the actuating means for the contactor 5 and prevents the possibility of having contactor 5 damaged. Further, the specific reactor 7 is not the only means whereby such protection may be provided, but reactor 7 may be replaced by a highly saturated transformer and the same desirable results accomplished. In fact in certain installations it has been found that a transformer is preferable, giving an even smaller current variation in coil 104.

When the load is disconnected from the alternator 52, that is, when the last current-consuming device 9 is disconnected from the main conductors 8 and 10, the energizing current for coil 104 will, of course, be removed and since the voltage of the alternator 52 will continue to be impressed across the actuating coil 63 of the double-pole contactor 64, a high resistance resistor 71 will remain in the circuit of the coil 4, thereby causing the contactor 5 to be deenergized to open its contact members 25. This opening of the contact members 25 opens the circuit for the actuating coil 27 of the line contactor 28, thereby short-circuiting the ignition of the internal combustion engine and stopping the plant. Further, as the speed of the engine decreases, coil 32 cannot be reenergized even though contact members 39 close, since the contact members 25 are open.

It is thus apparent that during starting the dynamo electric machine 43 will operate as a motor but is connected to charge the battery through an adjustable resistor when operating as a generator and that the internal combustion engine will continue to operate the alternator 52 to supply the load on the mains, but that the plant will shut down completely when the load is taken off the service mains 8 and 10. The circuits and contact members are however, so arranged after the internal combustion engine stops that, should a load be again applied to the mains 8 and 10, the starting cycle will be repeated and the internal combustion engine will again drive the alternator 52 to supply an alternating current to the mains 8 and 10.

Fig. 2 illustrates the use of a highly saturated transformer 7', in lieu of the reactor 7, having its secondary winding connected across two opposite terminals of the double wave rectifier 101, the other two terminals of which are connected to the coil 104 of relay 5.

Applicant is aware of the fact that others skilled in the art, particularly after having had the benefit of the teachings of this invention, may devise other circuit diagrams and systems of control for effecting the novel results specified by applicant, but he wishes to be limited only by the scope of the appended claims and the pertinent prior art.

I claim as my invention:

1. In an electric system of the alternating-current type, in combination, an internal combustion engine, an alternator coupled to said engine, a dynamo-electric machine also coupled to said engine, a battery, load circuits having current-consuming units adapted to be connected to said load circuits, an electromagnetically operable switch adapted to be operated from the battery upon the connection of a current-consuming unit to the load circuits, a starting electromagnetic switch controlled by said first-named switch and adapted to connect said dynamo-electric machine to said battery to operate as a motor to crank the engine, thermostatic time-limit means for limiting the cranking period of the engine, means responsive to the rise in voltage of the alternator adapted to so connect said first-named switch as to prevent the operation of said first-named switch from said battery and for causing its operation from the alternator responsive to the rise in alternator voltage for transferring the load circuits to the alternator, and means for stopping the engine upon the disconnection of the load, or current-consuming units, from said load circuits.

2. In a power plant of the alternating-current type, in combination, an internal combustion engine, an alternator connected to be driven by said engine, a governor responsive to the speed of the engine and the load on the alternator for controlling the engine, a reactor adapted to be connected to the alternator, a direct-current contactor adapted to be connected across the reactor having characteristics such that said contactor is energized substantially a constant amount regardless of variations in load, said contactor being adapted to control the starting and the stopping of said internal combustion engine, said starting control being further controlled by a battery, a dynamo-electric machine coupled to the engine and adapted to be connected to the battery by operation of said contactor, and thermostatic time-limit means for controlling the time interval such dynamo-electric machine remains connected to said battery, should the engine fail to start.

3. In a power plant of the alternating-current type, in combination, an alternator, load circuits for the alternator, a reactor connected in the load circuit, said reactor being designed to have a reactance that varies inversely with the variation of the load in the load circuits whereby the voltage across its terminals remains substantially constant, a contactor adapted to be energized by the voltage across the reactor, a dynamo-electric machine, a battery, an internal combustion engine coupled to said alternator and to said dynamo-electric machine, means associated with said contactor responsive to the load in the load circuits adapted to control the interconnection of the battery with said dynamo-electric machine to start the engine, and means responsive to the rise in alternator voltage to deenergize said means associated with said contactor for initiating the starting of the internal combustion engine.

4. In an electric system of the alternating-current type, in combination, an internal combustion engine, an alternator coupled to said engine, a dynamo-electric machine also coupled to said engine, a battery, load circuits having current-consuming units adapted to be connected to said load circuits, a direct-current contactor adapted to be energized upon the connection of a current-consuming unit to the load circuits, a direct-current starting contactor controlled by said first-named contactor and adapted to connect said dynamo-electric machine to said battery to operate as a motor to crank the engine, thermostatic time-limit means for limiting the cranking period of the engine, a rectifier coupled to the alternator, direct-current means, coupled to the rectifier and thus responsive to the rise in voltage of the alternator, for preventing the energization of said first-named contactor by said battery and for energizing it with direct current from the rectifier, means responsive to a current characteristic of the alternator for transferring the load circuits to the alternator, and means for stopping the engine when the load or current consuming units are disconnected from said load circuits.

5. In a power plant of the alternating-current type, in combination, an internal combustion engine, an alternator connected to be driven by said engine, a governor responsive to the speed of the engine and the load on the alternator for controlling the engine, a reactor adapted to be connected to the alternator, a direct-current contactor and current-modifying means adapted to be connected across the reactor, said reactor being designed to have characteristics such that said contactor is energized substantially a constant amount regardless of variations in load, said contactor being adapted to control the starting of the internal combustion engine and the stopping of said internal combustion engine, said starting control being further controlled by a battery, a dynamo-electric machine coupled to the engine and adapted to be connected to the battery by operation of said contactor, and thermostatic time-limit means for controlling the time interval such dynamo-electric machine remains connected to said battery, should the engine fail to start.

6. In a power plant of the alternating-current type, in combination, an internal combustion engine, an alternator connected to be driven by said engine, a governor responsive to the speed of the engine and the load on the alternator for controlling the engine, a reactor adapted to be connected to the alternator, a rectifier connected across the reactor, a direct-current contactor connected to the rectifier, said reactor being designed so that said contactor is energized substantially a constant amount regardless of variations in load, said contactor being adapted to control the starting of the internal combustion engine and the stopping of said internal combustion engine, said starting control being further controlled by a battery, a dynamo-electric machine coupled to the engine and adapted to be connected to the battery by operation of said contactor, and thermostatic time-limit means for controlling the time interval such dynamo-electric machine remains connected to said battery, should the engine fail to start.

7. In a power plant of the alternating-current type, in combination, an internal combustion engine, an alternator connected to be driven by said engine, a governor responsive to the speed of the engine and the load on the alternator for controlling the engine, a transformer adapted to be connected across the alternator having characteristics such that said contactor is energized substantially a constant amount regardless of variations in load, said contactor being adapted to control the starting and the stopping of said internal combustion engine, said starting control being further controlled by a battery, a dynamo-electric machine coupled to the engine and adapted to be connected to the battery by operation of said contactor, and theremostatic time-limit means for controlling the time interval such dynamo-electric machine remains connected to said battery, should the engine fail to start.

8. In a power plant of the alternating-current type, in combination, an internal combustion engine, an alternator connected to be driven by said engine, a governor responsive to the speed of the engine and the load on the alternator for controlling the engine, a transformer adapted to be connected to the alternator, a direct-current contactor and current-modifying means adapted to be connected across the transformer, said transformer being designed to have characteristics such that said contactor is energized substantially a constant amount regardless of variations in load, said contactor being adapted to control the starting and the stopping of said internal combustion engine, said starting control being further controlled by a battery, a dynamo-electric machine coupled to the engine and adapted to be connected to the battery by operation of said contactor, and thermostatic time-limit means for controlling the time interval such dynamo-electric machine remains connected to said battery, should the engine fail to start.

9. In a power plant of the alternating-current type, in combination, an internal combustion engine, an alternator connected to be driven by said engine, a governor responsive to the speed of the engine and the load on the alternator for controlling the engine, a transformer having a primary winding and a secondary winding adapted to be connected to the alternator, a rectifier connected across said secondary winding, a direct-current contactor connected to the rectifier, said transformer being designed so that said contactor is energized substantially a constant amount regardless of variations in load, said contactor being adapted to control the starting and the stopping of said internal combustion engine, said starting control being further controlled by a battery, a dynamo-electric machine coupled to the engine and adapted to be connected to the battery by operation of said contactor, and thermostatic time-limit means for controlling the time interval such dynamo-electric machine remains connected to said battery, should the engine fail to start.

10. In a power plant of the alternating-current type, in combination, an alternator, load circuits for the alternator, a transformer connected in the load circuit, said transformer being designed to vary its secondary output inversely with the variation of the load in the load circuits whereby the voltage across its terminals remains substantially constant, a contactor adapted to be energized by the voltage of the secondary of the transformer, a dynamo-electric machine, a battery, an internal combustion engine coupled to said alternator and to said dynamo-electric machine, means associated with said contactor responsive to the load in the load circuits adapted to control the interconnection of the battery with said dynamo-electric machine to start the engine, and means responsive to the rise in alternator voltage to deenergize said means associated with said contactor for initiating the starting of the internal combustion engine.

11. An automatic generating plant comprising an alternator, a prime mover for driving said alternator, a pair of current distribution mains, a source of direct current, means responsive to a demand for current on said mains for starting said prime mover by means of energy supplied by said source of direct current, a transformer having a primary winding, means effective when said prime mover becomes started for connecting said alternator with said distribution mains in series with the primary winding of said transformer, and means controlled by said transformer for automatically stopping said prime mover when the demand for current on said distribution mains ceases.

12. An automatic generating plant comprising an alternator, a prime mover for driving said alternator, a pair of current distribution mains, a source of direct current, means responsive to a demand for current on said mains for starting said prime mover by means of energy supplied by said source of direct current, a transformer having a primary winding and a secondary winding, means effective when said prime mover becomes started for connecting said alternator with said distribution mains in series with the primary winding of said transformer, a rectifier, a direct current relay connected with the secondary winding of said transformer through said rectifier, whereby said relay will be energized by current from said prime mover whenever said prime mover is supplying current to said distribution mains, and means for automatically stopping said prime mover when said relay becomes deenergized.

13. An automatic generating plant comprising an alternator, a prime mover for driving said alternator, a storage battery, a pair of current distribution mains, a direct current relay, means for starting and stopping said prime mover according as said relay is energized or deenergized; means effective when a load becomes connected across said mains for completing a pick-up circuit for said relay including said storage battery, said load, and said distribution mains; means effective when said prime mover becomes started in response to the resultant energization of said relay for connecting said alternator with said mains and for interrupting the pickup circuit for said relay, and means effective when said alternator becomes connected with mains for supplying said relay with direct current from said alternator as long as said alternator continues to supply current to said mains.

14. An automatic generating plant comprising an alternator, a prime mover for driving said alternator, a storage battery, a pair of current distribution mains, a direct current relay, means for starting and stopping said prime mover according as said relay is energized or deenergized; means effective when a load becomes connected across said mains for completing a pick-up circuit for said relay including said storage battery, said load, and said distribution mains; means effective when said prime mover becomes started in response to the resultant energization of said relay for connecting said alternator with said mains and for interrupting the pick-up circuit for said relay, and means effective when said alternator becomes connected with mains for supplying said relay with direct current from said alternator as long as said load remains connected with said mains.

15. An automatic generating plant comprising an alternator, a pair of current distribution mains, a source of direct current, a relay, means for starting and stopping said prime mover according as said relay is energized or deenergized, means responsive to a demand for current on said mains for energizing said relay from said source of direct current over said mains until said prime mover starts, means effective when said prime mover starts for connecting said alternator with said distribution mains, and means effective after said alternator becomes connected with said mains for subsequently supplying said relay with current from said alternator as long as the demand for current on said mains continues.

16. An automatic generating plant comprising an alternator, a prime mover for driving said alternator, a pair of current distribution mains, a storage battery, a direct current relay, means for starting and stopping said prime mover according as said relay is energized or deenergized, means responsive to a demand for current on said mains for energizing said relay from said source of direct current until said prime mover starts, a transformer having a primary and a secondary winding, means effective when said prime mover starts for connecting said alternator with said distribution mains in series with the primary winding of said transformer, and means receiving energy from the secondary winding of said transformer for supplying said relay with direct current.

17. An automatic generating plant comprising an alternator, a prime mover for driving said alternator, a pair of current distribution mains, a storage battery, a direct current relay, means for starting and stopping said prime mover according as said relay is energized or deenergized, means responsive to a demand for current on said mains for energizing said relay from said source of direct current until said prime mover starts, a transformer having a primary and a secondary winding, means controlled by said relay and effective when said prime mover starts for connecting said alternator with said distribution mains in series with the primary winding of said transformer, and means receiving energy from the secondary winding of said transformer for supplying said relay with direct current.

18. An automatic generating plant comprising an alternator, a prime mover for driving said alternator, a direct current relay, means for starting and stopping said plant according as said relay is energized or deenergized, a source of direct current, means for connecting said direct current relay with said source of current when a demand for current exists on said distribution mains, an alternating current relay, means effective when said direct current relay is energized for connecting said alternating current relay with said alternator, means effective when said alternating current relay becomes energized for disconnecting said direct current relay from said source of direct current and for connecting said alternator with said distribution mains, and means effective after said alternator becomes connected with said distribution mains for supplying said direct current relay with direct current from said alternator until the demand for current on said mains continues.

19. An automatic generating plant comprising an alternator, a prime mover for driving said alternator, a direct current relay, means for starting and stopping said plant according as said relay is energized or deenergized, a source of direct current, means for connecting said direct current relay with said source of current when a demand for current exists on said distribution mains, an alternating current relay, means effective when said direct current relay is energized for connecting said alternating current relay with said alternator, a transformer having a primary and a secondary winding, means effective when said alternating current relay is energized for disconnecting said direct current relay from said source of direct current and for connecting said alternator with said distribution mains in series with the primary winding of said transformer, and means including a rectifier for connecting said direct current relay with the secondary winding of said transformer.

20. A generating plant comprising an alternator, a prime mover for driving said alternator, a pair of current distribution mains, an alternating current relay, a source of direct current, a direct current relay, means for supplying said direct current relay with current from said source of direct current in response to a demand for current on said distribution mains to energize said direct current relay, means effective when said direct current relay becomes energized for starting said prime mover and for connecting said alternating current relay with said alternator, means effective when said alternating current relay becomes energized for connecting said distribution mains with said alternator, other means effective when said alternating current relay becomes energized for cutting off the supply of direct current from said source of direct current to said direct current relay and for subsequently supplying said direct current relay with direct current from said alternator as long as a demand for current on said distribution mains continues, and means effective when said direct current relay becomes deenergized for stopping said prime mover.

STANLEY A. BOBE.